United States Patent
Tanno et al.

(10) Patent No.: US 11,536,385 B2
(45) Date of Patent: Dec. 27, 2022

(54) FLUID CONTROL DEVICE (71) Applicant: Fujikin Incorporated, Osaka (JP)

(72) Inventors: Ryutaro Tanno, Osaka (JP); Tsutomu Shinohara, Osaka (JP); Yuya Suzuki, Osaka (JP); Hidenori Kiso, Osaka (JP)

(73) Assignee: Fujikin Incorporated, Osaka (JP)

( * ) Notice: Subject to any disclaimer, the term of this patent is extended or adjusted under 35 U.S.C. 154(b) by 17 days.

(21) Appl. No.: 17/257,001

(22) PCT Filed: Jun. 4, 2019

(86) PCT No.: PCT/JP2019/022102
§ 371 (c)(1),
(2) Date: Dec. 30, 2020

(87) PCT Pub. No.: WO2020/012828
PCT Pub. Date: Jan. 16, 2020

(65) Prior Publication Data
US 2021/0123544 A1 Apr. 29, 2021

(30) Foreign Application Priority Data
Jul. 9, 2018 (JP) .............................. JP2018-129671

(51) Int. Cl.
*F16K 27/02* (2006.01)
*F16K 7/16* (2006.01)
*F16K 37/00* (2006.01)

(52) U.S. Cl.
CPC ............ *F16K 27/0236* (2013.01); *F16K 7/16* (2013.01); *F16K 37/005* (2013.01); *F16K 37/0041* (2013.01)

(58) Field of Classification Search
CPC ...... F16K 37/0041; F16K 7/16; F16K 37/005; F16K 27/0236; F16K 31/1221; F16K 31/1226; F16K 7/17; F16K 27/02; F16K 37/0025
See application file for complete search history.

(56) References Cited

U.S. PATENT DOCUMENTS

| | | |
|---|---|---|
| 5,869,766 A | 2/1999 | Cucci et al. |
| 2002/0026959 A1 | 3/2002 | Miyazoe et al. |
| 2004/0004201 A1* | 1/2004 | Larsen ................ F16K 31/0655 251/129.07 |
| 2005/0092079 A1 | 5/2005 | Ales |
| 2008/0029174 A1 | 2/2008 | Yoshino |

(Continued)

FOREIGN PATENT DOCUMENTS

| | | |
|---|---|---|
| JP | S62-177389 | 8/1987 |
| JP | H02-309079 | 12/1990 |

(Continued)

*Primary Examiner* — Atif H Chaudry
(74) *Attorney, Agent, or Firm* — Chris Mizumoto (57) ABSTRACT

A fluid control device, capable of acquiring data related to an internal operation of a device, is provided. The Fluid control device V includes a bonnet part installing sensors for detecting the internal operation of the fluid control device and a valve body containing the bonnet part inside, and the valve body has a recess for containing the bonnet part and a slit, leading a communication cable connected to the sensors to the outside, opening one end on an opposite side of a base where a flow path is formed, and penetrating from an outside to the recess.

12 Claims, 6 Drawing Sheets

(56) References Cited

U.S. PATENT DOCUMENTS

2009/0140194 A1* 6/2009 Kato .................. F16K 7/14
 251/318
2013/0142675 A1 6/2013 Nabei et al.
2017/0016556 A1 1/2017 Okuda

FOREIGN PATENT DOCUMENTS

| JP | 3142304 B | 12/2000 |
|---|---|---|
| JP | 2001-525538 | 12/2001 |
| JP | 2002-81568 | 3/2002 |
| JP | 2006-072460 | 3/2006 |
| JP | 2006-072515 | 3/2006 |
| JP | 2007-525622 | 9/2007 |
| JP | 2010-78002 | 4/2010 |
| JP | 5150009 B2 | 12/2012 |
| JP | 2017-20632 | 1/2017 |
| KR | 2010-021404 | 3/2013 |
| WO | 099/28719 | 6/1999 |
| WO | 2005/036039 | 4/2005 |

* cited by examiner

FLUID CONTROL DEVICE

CROSS-REFERENCE

This application is a national phase of an international application, PCT/JP2019/022102 filed on Jun. 4, 2019, which claims the benefit of Japanese Application No. 2018-129671, filed on Jul. 9, 2018. All of the documents cited herein are incorporated by reference in their entirety.

TECHNICAL FIELD

The present invention relates to a fluid control device that accommodates therein a sensor inside of the device and is able to output data detected by the sensor.

BACKGROUND ART

A film forming process, for forming a thin film on a surface of a semiconductor wafer, has been required to achieve a finer thin film. In this context, recently, a film forming method, known as Atomic Layer Deposition (ALD), capable of forming a thin film with a thickness at an atomic level or a molecular level has been employed.

Meanwhile, due to such an attempt to achieve finer thin films, fluid control devices have been required to perform opening/closing operations more frequently than ever. The resultant load may lead to a higher risk of fluid leakage and the like. Thus, there has been an increasing demand for technology enabling the fluid leakage of the fluid control device to be easily detected.

In addition, if leaks can be easily detected and data associated with operations can be collected, it is possible to understand the frequency of usage and individual differences of the fluid control device, which could not be considered in the past, and it is possible to control the fluid control device more accurately than ever before.

In this context, Patent Document 1 proposes a controller with a seal portion damage detection mechanism including a hole formed on an outer surface of the controller for controlling the flow rate of a fluid and a leak detection member attached to the hole. The hole connects to a gap in the controller, the leak detection member reacts to the presence of a certain fluid, and the hole connects to the outside with the leak detection member attached.

CITATION LIST

Patent Literature

Patent Literature 1: JP3142304B2

SUMMARY OF INVENTION

Technical Problem

The controller with a seal portion damage detection mechanism described in Patent Document 1 is provided with the leak detection member and electrically connected with a signal generator outside of the controller. On the other hand, a fluid control device, not only detecting leaks, but also acquiring data related to an internal operation of devices in normal time, has not been provided hitherto.

Thus, one object of the present invention is to provide a fluid control device that is able to acquire data related to an internal operation of the device.

Solution to Problem

In order to achieve the above object(s), a fluid control device according to the present invention is the fluid control device capable of acquiring data related to an internal operation. The fluid control device includes a bonnet part installed with one or a plurality of sensor for detecting the internal operation of the fluid control device, and a valve body containing the bonnet part inside. The valve body is provided with a recess containing at least a part of the bonnet part, and a slit leading a communication cable connected to the sensor to an outside, opening one end on an opposite side of a base where a flow path is famed, and penetrating from the outside to the recess side.

Further, one of the sensor may be a magnetic sensor detecting changes in a magnetic field of a magnet and a magnetic body separated from each other. The fluid control device may further includes a cylindrical diaphragm retainer installing the magnetic body along with pressing a diaphragm, and a rotation regulator regulating circumferential rotation of the diaphragm retainer, slidably inserted into a penetration hole provided in the bonnet part. The bonnet part may include the magnet along with the penetration hole inserting the diaphragm retainer.

Further, one of the sensor may be a pressure sensor detecting a pressure in a space isolated by a diaphragm, and the bonnet part installs the pressure sensor.

Further, an end of the cable may be connected to a connector provided outside of the fluid control device. The fluid control device further may further include a fastener fastening the connector to the fluid control device.

Further, the valve body may have a rectangular base, and the fastener fastens the connector to the fluid control device in a diagonal direction of the base of the valve body.

Further, the communication cable connected to the sensor may be a flexible printed circuits with flexibility.

Advantageous Effects of Invention

According to the present invention, the fluid control device is able to acquire data related to the internal operation of the device.

PREFERRED EMBODIMENT

A fluid control device according to an embodiment of the present invention will be described below with reference to the drawings.

In the following description, the directions of members and the like may be referred to as upper, lower, left, and right depending on the directions in the drawings for the sake of convenience, but these do not limit the directions of members or the like in the actual situation or an embodiment of the present invention.

Figure 1:
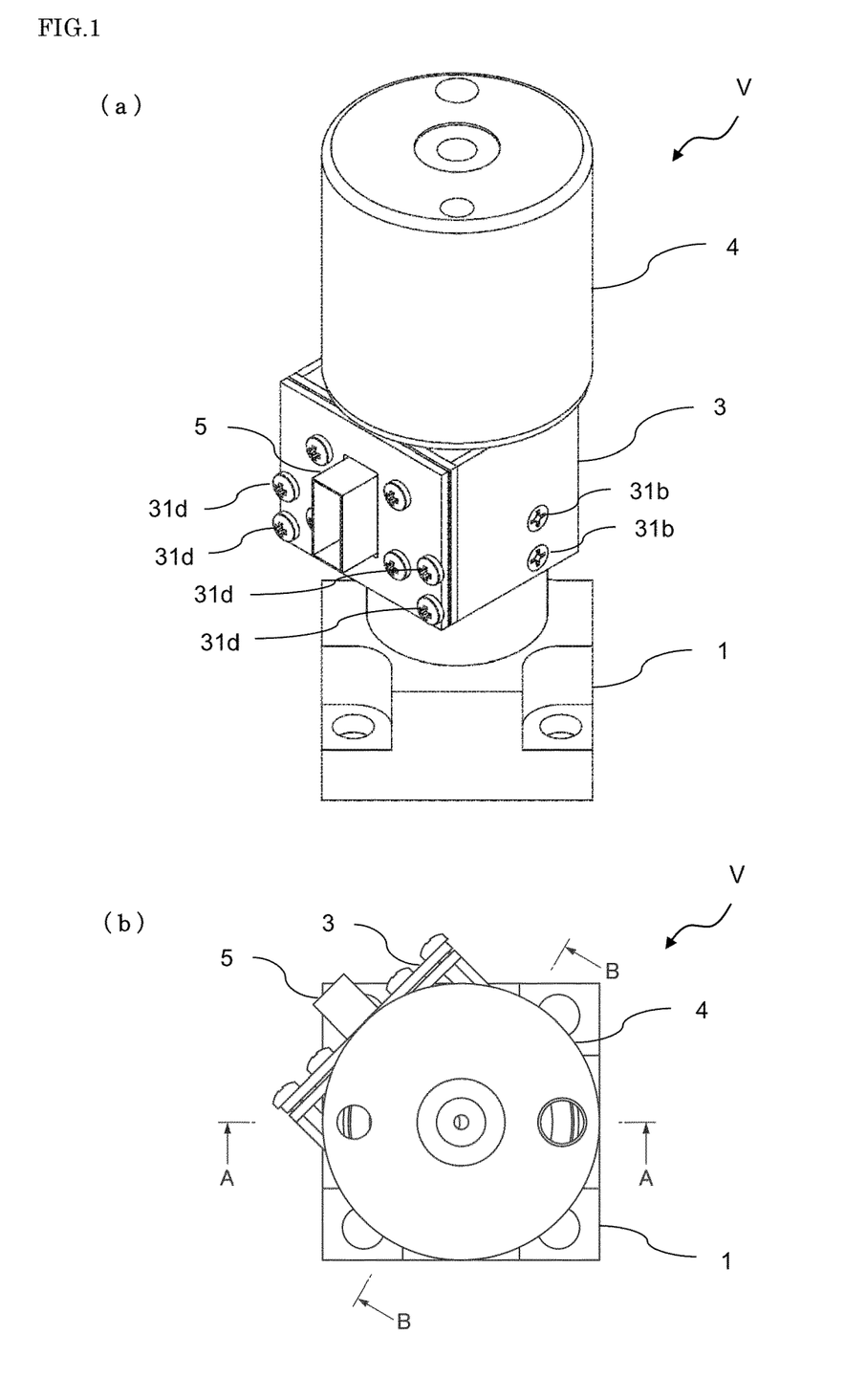
FIG. 1 is a diagram illustrating (a) an external perspective view and (b) a plan view of the fluid control device according to the present embodiment.

As illustrated in FIG. 1, a fluid control device V according to the present embodiment includes a sensor for detecting an internal operation of the fluid control device V, and is an air-operated direct diaphragm valve that performs wired communication between other terminals and the like.

The other terminals noted here may include not only so-called computers, but also other devices and apparatuses, such as other fluid control devices and flow rate control apparatuses.

Figure 2:
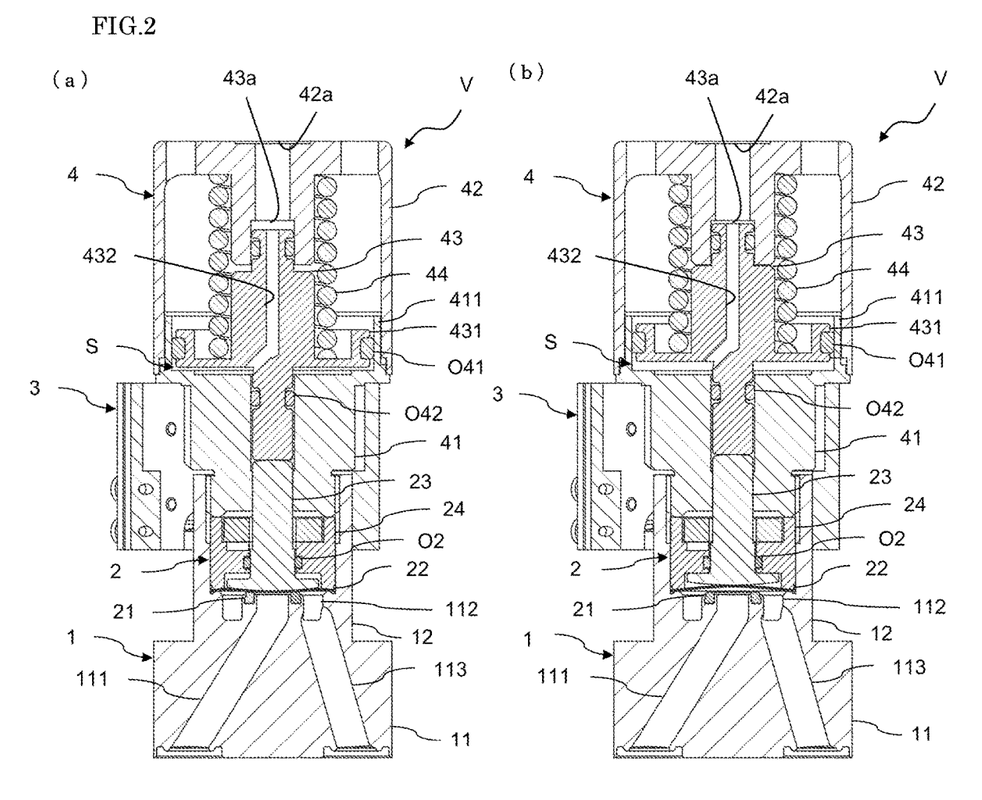
FIG. 2 is a diagram illustrating a cross-sectional view taken along line A-A of an internal structure of the fluid control device according to the present embodiment, and (a) is illustrating a closing valve state and (b) is illustrating an opening valve state.
Figure 3:
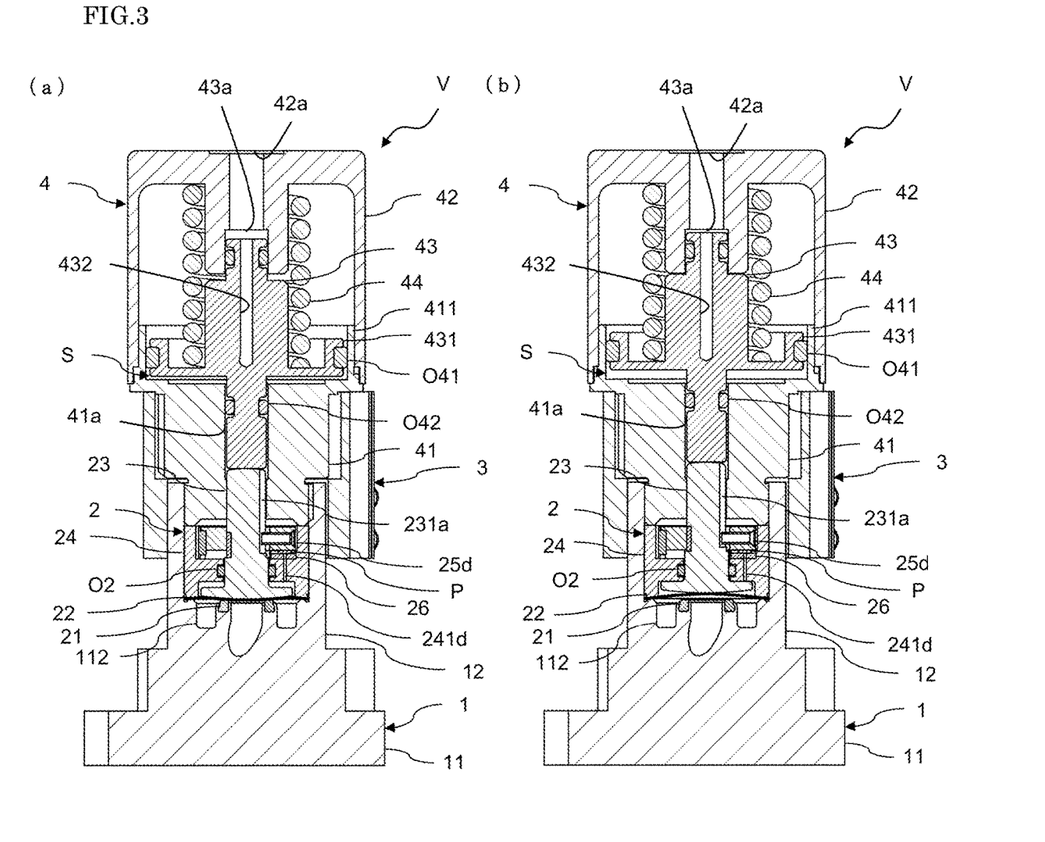
FIG. 3 is a diagram illustrating a cross-sectional view taken along line B-B of an internal structure of the fluid control device according to the present embodiment, and (a) is illustrating a closing valve state and (b) is illustrating an opening valve state.

The fluid control device V according to the present embodiment is a device, capable of acquiring data related to an internal operation, including a valve body 1, a bonnet part 2, a cover part 3, and an actuator part 4 as illustrated in FIGS. 1 to 3.

Valve Body 1

Figure 4:
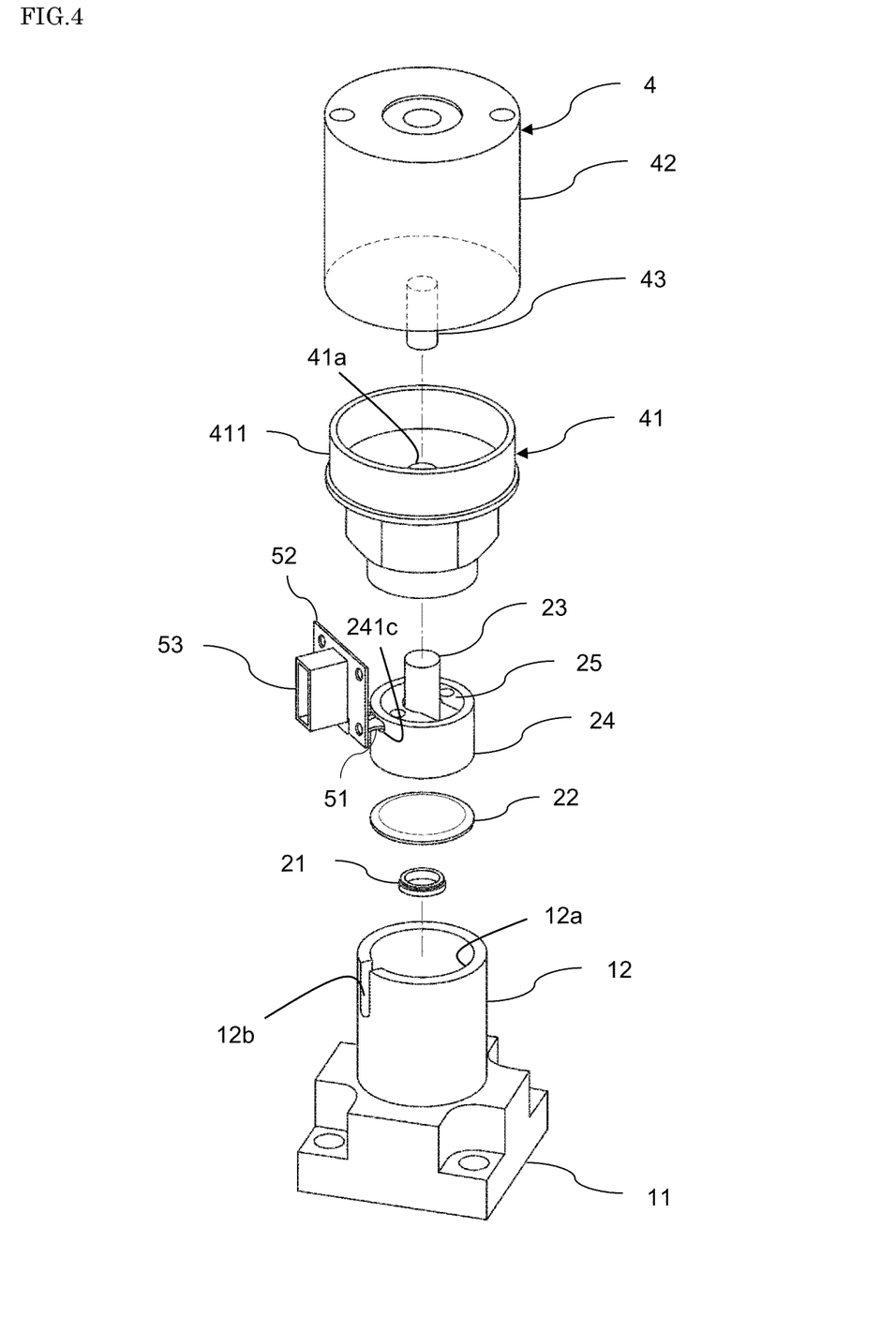
FIG. 4 is a diagram illustrating an exploded perspective view of the fluid control device according to the present embodiment.

The valve body 1, as illustrated in FIGS. 2 to 4, includes a base 11 where a flow path is formed and a cylindrical part 12 of substantially cylindrical shape provided on the base 11.

The base 11 is a rectangular shape in a plan view and becomes a part located on a substrate or a manifold block when it configures a fluid control apparatus unitized by a plurality of fluid control device V.

The cylindrical part 12 is a hollow shape with an open end face on a side where the bonnet part 2 is arranged, and an inside of the hollow constitutes a recess 12a storing the bonnet part 2.

This cylindrical part 12 has a slit 12b, which has a length in an axial direction, which opens on one side opposite to the base 11 and at a side where the bonnet part 2 is placed, and which is penetrated to a side of the recess 12a from the outside. A flexible cable 51 extending from a bonnet wall 25 through this slit 12b is led out from the inside to the outside.

Below the recess 12 a and the inside of the base 11, an inflow path 111 where a fluid flows in, an outflow path 113 where the fluid flows out, and a valve chamber 112 connecting with the inflow path 111 and the outflow path 113, are famed. The inflow path 111, the outflow path 113, and the valve chamber 112 integrally constitute a flow path where the fluid flows.

Bonnet Part 2

The bonnet part 2, as illustrated in FIGS. 2 to 5, is placed in a state of being stored in the inside of the recess 12a of the valve body 1.

This bonnet part 2 includes a seat 21, a diaphragm 22, a diaphragm retainer 23, a bonnet 24, and the bonnet wall 25.

The annular seat 21 is provided on a periphery of a point connecting the inflow path 111 and the outflow path 113. On the seat 21, the diaphragm 22, where the fluid is flowed and the flow is blocked from the inflow path 111 to the outflow path 113 by being detached and brought into contact with the fluid to the seat 21, is provided.

The diaphragm 22 is made of metal such as stainless steel or a NiCo-based alloy and/or a fluorine-based resin, is a spherical shell-shaped member with a convex central part, and separates the flow path from a space where the actuator part 4 operates. When air serving as a driving pressure is supplied and released from a pressure of the diaphragm retainer 23, as illustrated in FIG. 2(b) and FIG. 3(b), this diaphragm 22 is detached from the seat 21 by its own restoring force and pressure in the flow path, and the central part is displaced in a direction away from the seat 21. As a result, the valve chamber 112 is opened whereby the inflow path 111 and the outflow path 113 connect to each other. On the other hand, air serving as the driving pressure is terminated and the diaphragm 22 is pressed by the diaphragm retainer 23, as illustrated in FIG. 2(a) and FIG. 3(a), the center part of the diaphragm 22 is displaced in a direction toward being in contact with the seat 21 to be in contact with the seat 21. As a result, the valve chamber 112 is closed whereby the inflow path 111 and the outflow path 113 are blocked.

The diaphragm retainer 23 is provided on an upper side of the diaphragm 22, is supported to be vertically movable by the bonnet 24, and presses the center part of the diaphragm 22 in conjunction with a sliding piston 43.

This diaphragm retainer 23 includes a substantially column shaped base body 231 and an increased diameter portion 232 with increased diameter at one end on a side in contact with the diaphragm 22.

A bottomed groove 231a, having a length in an axial direction and opening on one side opposite to the increased diameter portion 232, is formed in the base body 231. A shank part of a screw 25d screwed into a screw hole 25c of the bonnet wall 25 fit slidably to the base body 231. The groove 231a and the screw 25d constitute a rotation regulator regulating circumferential rotation of the diaphragm retainer 23 whereby the diaphragm retainer 23 vertically moves in conjunction with the sliding piston 43 and is regulated the circumferential rotation.

In addition, a magnet M1 constituting a magnetic sensor is installed on the base body 231. This magnet M1 constitutes the magnetic sensor described later with a magnetic body M2 installed on the bonnet wall 25. In the present embodiment, the magnet M1 is installed on an opposite side of the groove 231a of the base body 231, but it is possible to be installed anywhere on the base body 231 as long as a configuration of the magnetic body M2 and the magnetic sensor is not disturbed.

The increased diameter portion 232 is brought into contact with the diaphragm 22 on its underside and presses the diaphragm 22 in conjunction with the sliding piston 43.

The bonnet 24 is substantially cylindrical, covers the valve chamber 112, and is stored in the recess 12a of the valve body 1.

A substantially disk-shaped partition 241, where a penetration hole 241a is famed in a center and the diaphragm retainer 23 is penetrated to the penetration hole 241a, is provided inside of the bonnet 24.

The bonnet wall 25 is stored in the recess 24a, formed above the partition 241 or on a side where the actuator part 4 is arranged. Screw holes 241b and through holes 25e are provided in each of the partition 241 and the bonnet wall 25 at positions corresponding to each other, and the bonnet wall 25 is screwed to the bonnet 24 by a bolt 25f.

The partition 241 of the bonnet 24 has a certain thickness, and an O-ring O2 is interposed between an inner peripheral surface of the penetration hole 241a formed in the partition 241 and the diaphragm retainer 23. As a result, an airtightness of a space defined by the partition 241 and the diaphragm 22 is ensured.

Further, a connection hole 241d, connected to a pressure sensor P installed in the bonnet wall 25, is provided in the partition 241 of the bonnet 24. Since the pressure sensor P is provided through the connection hole 241d, a pressure inside of the space defined by the partition 241 and the diaphragm 22 is possible to be measured.

Furthermore, on a side of the bonnet 24, a through hole 241c is provided for leading the flexible cable 51, leading from the bonnet wall 25 stored inside, to the outside.

The bonnet wall 25 is a member arranged in the bonnet 24. This bonnet wall 25 has a shape that is a thick substantially disk-shaped member hollowed out in a C-shape in a plan view. In a center of the bonnet wall 25, a penetration hole 25a is provided to penetrate the base body 231 of the diaphragm retainer 23. In addition, an opening 25b is provided to opens the penetration hole 25a to an outward in a radial direction of the bonnet wall 25.

The screw hole 25c, threaded outward in a radial direction from the penetration hole 25a, is famed at a predetermined location of a thick part of the bonnet wall 25. The screw 25d is screwed into this screw hole 25c from the outside, and an axial part of the screwed screw 25d comes out to the penetration hole 25a and slidably fits to the groove 231a of the diaphragm retainer 23 penetrated to the penetration hole 25a.

The through hole 25e is provided in the bonnet wall 25 at a position corresponding to the screw hole 241b of the bonnet 24. The bolt 25f is screwed into the screw hole 241b and the through hole 25e with the bonnet wall 25 arranged on the partition 241 of the bonnet 24, whereby the bonnet wall 25 is fixed to the bonnet 24.

The flat plate-shaped magnetic body M2, fixed to lay and close the opening 25b, is installed close to the opening 25b of an outer peripheral surface of the bonnet wall 25. This magnetic body M2 constitutes the magnetic sensor described later with the magnet M1 installed in the diaphragm retainer 23.

Cover Part 3

Figure 6:
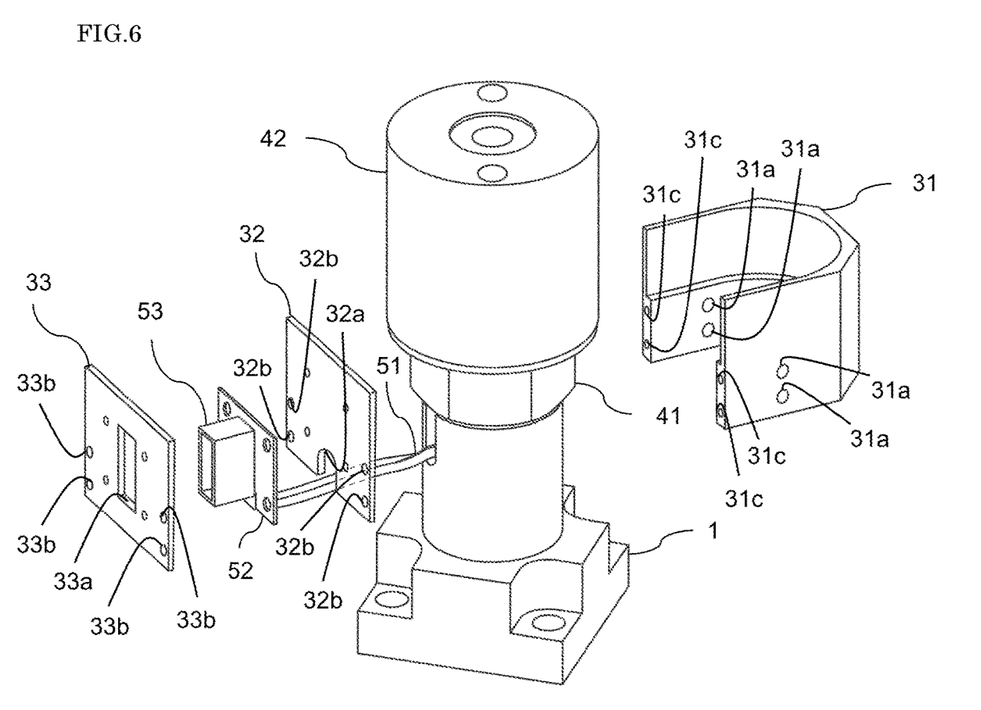
FIG. 6 is a diagram illustrating an exploded perspective view of the fluid control device according to the present embodiment.

The cover part 3, as illustrated in FIG. 1 and FIG. 6, compresses and integrally holds an actuator body 41 and the valve body 1, and constitutes a fastener fastening a circuit board 52 and a connector 53, provided in the circuit board 52, to the fluid control device V.

This cover part 3 includes a cover 31 and flat plates 32 and 33.

The cover 31 is a substantially U-shaped, and the actuator body 41 and an end part of the valve body 1 is fitted inside of the cover 31.

Screw holes 31a are provided on both side of the cover 31 corresponding to positions where the actuator body 41 is fitted. As a result, when the screw 31b is screwed into the screw hole 31a with the valve body 1 fitted inside and a tip of the screw 31b is pressed against the valve body 1, the inside of the cover 31 is able to support the valve body 1 from both sides thereof.

Furthermore, the screw holes 31c are provided in a thick part of the cover 31. The plates 32 and 33 are installed to the cover 31 by screwing the screws 31d into the screw holes 31c via the through holes 32b and 33b of the plates 32 and 33.

The plates 32 and 33 are screwed and fixed to the cover 31 while the actuator body 41 and the end part of the valve body 1 are fitted inside of the cover 31, and compresses and holds the actuator body 41 and the valve body 1 between the cover 31 in the fixed state.

A notch 32a cut out a tongue-shape is famed below the plate 32, and the flexible cable 51 is lead via this notch 32a to the circuit board 52, where the connector 53 is provided.

The plate 33 is screwed and fixed to the plate 32 and the cover 31 while the circuit board 52 is interposed between the plate 32 and 33, and compresses and holds the circuit board 52 between the plate 32 and 33.

The plate 33 is provided with a substantially rectangular shaped through hole 33a in a central part, and the connector 53 provided in the circuit board 52 is lead to the outside from this through hole 33a.

The base 11 is in a rectangular shape in a plan view, and the cover part 3, as illustrated in FIG. 1(b), fixes the connector 53 to the fluid control device V in a diagonal direction of the rectangular base 11. The reason for fixing the connector 53 in this direction is as follows. When constituting the fluid control apparatus (a gas box) unitized by a plurality of fluid control device V, it is preferable to align a direction of adjacent rectangular base 11 to eliminate interval as much as possible, and it is preferable to arrange the fluid control device V on a substrate or a manifold block due to a demand for integration. On the other hand, when they are arranged and integrated in this way, it becomes difficult to connect terminals or the like to the connector 53. Thus, by directing the connector 53 in the diagonal direction of the base 11, it is possible to take a wider space for connection compared to direct to the fluid control device V, located right next to it. As a result, it is easy to connect terminals and the like to the connector 53, it is possible to prevent problems such as disconnection due to broken or twisted terminals and the like, and it is possible to prevent problems that terminals come into contact with the fluid control device V to cause an abnormality in an operation of the fluid control device V.

Actuator Part 4

The actuator part 4 is arranged above the bonnet part 2. This actuator part 4, as illustrated in FIG. 2 and FIG. 3, includes the actuator body 41, an actuator cap 42, a piston 43, and a spring 44. Although the internal structure of the actuator part 4 is omitted in FIG. 4, the internal structure is as illustrated in FIG. 2 and FIG. 3.

The actuator body 41 is interposed between the piston 43 and the bonnet 24.

As illustrated in FIG. 4, the actuator body 41 has a substantially cylindrical shape, and a penetration hole 41a where the piston 43 and the diaphragm retainer 23 is penetrated is provided along a length direction at a center. As illustrated in FIG. 2 and FIG. 3, the piston 43 is brought into contact with the diaphragm retainer 23 in the penetration hole 41a, and the diaphragm retainer 23 vertically moves in conjunction with a vertical move of the piston 43.

A peripheral wall 411 having an annular projection is formed on an upper end surface on a side where the piston 43 is arranged, and a driving pressure introduction chamber S, where a driving pressure is introduced, is formed between a flat horizontal surface inside of the peripheral wall 411 and a lower end surface of the increased diameter portion 431 of the piston 43.

Further, an external thread is threaded on an outer peripheral surface of one end of the actuator body 41, and the actuator body 41 is installed to one end of the actuator cap 42 by screwing the external thread to an internal thread threaded on an inner peripheral surface of the actuator cap 42.

A center of a length direction of the actuator body 41 is formed a substantially hexagonal shape in cross sectional view, an upper end part of the substantially hexagonal shape in cross sectional view and the valve body 1 are integrally compressed by the cover 31.

The actuator cap 42 is a cap-shaped member, having an open lower end, and stores the piston 43 and the spring 44 inside.

An opening 42a, connecting to a driving pressure introduction path 432 of the piston 43, is provided in an upper end surface of the actuator cap 42.

A lower end of the actuator cap 42 is closed by screwing an upper part of the actuator body 41.

The piston 43 vertically moves in conjunction with supplying and stopping of the driving pressure, and the diaphragm 22 is brought into contact with and detached from the seat 21 through the diaphragm retainer 23.

A substantially center in an axial direction of the piston 43 is expanded in a disk-shape and constitutes the increased diameter portion 431. The piston 43 receives a bias of the spring 44 on an upper surface of the increased diameter portion 431. Further, a driving pressure introduction chamber S where the driving pressure is supplied is famed on a lower end of the increased diameter portion 431.

Furthermore, the driving pressure introduction path 432 is provided inside of the piston 43 to connect the opening 43a, formed on an upper end surface, and the driving pressure introduction chamber S, famed on a lower end. The opening 43a of the piston 43 is connected to the opening 42a of the actuator cap 42, an introduction pipe introducing the driving pressure from the outside is connected to the opening 42a, and the driving pressure is supplied to the driving pressure introduction chamber S as a result.

An O-ring O41 is installed on an outer peripheral surface of the increased diameter portion 431 of the piston 43, and the O-ring O41 seals an outer peripheral surface of the increased diameter portion 431 and the peripheral wall 411 of the actuator body 41. Further, the O-ring O42 is installed on a lower end of the piston 43, and the O-ring O42 seals an outer peripheral surface of the piston 43 and an inner peripheral surface of the penetration hole 41a of the actuator body 41. The driving pressure introduction chamber S, connected to the driving pressure introduction path 432 in the piston 43 is formed by these O-rings O41 and O42, and an airtightness of this driving pressure introduction chamber S is ensured.

The spring 44 is wound around an outer peripheral surface of the piston 43, is brought into contact with an upper surface of the increased diameter portion 431 of the piston 43, and biases the piston 43 in a downward, such as pushing down the diaphragm 22, direction.

An opening/closing operation of the valve accompanying a supply and a stop of the driving pressure is mentioned. When air is supplied from the introduction pipe (not illustrated in figures) connected to the opening 42a, the air is lead to the driving pressure introduction chamber S via the driving pressure introduction path 432 in the piston 43. In response, the piston 43 is pushed upward against the bias of the spring 44. As a result, the diaphragm 22 is detached from the seat 21, the valve is opened, and the fluid flows. On the other hand, when the air is not lead to the driving pressure introduction chamber S, the piston 43 is pushed downward according to the bias of the spring 44. As a result, the diaphragm 22 comes into contact with the seat 21, the valve is closed, and the fluid is blocked.

Sensor

The fluid control device V includes the pressure sensor P and the magnetic sensor, having the magnet M1 and the magnetic body M2, as a sensor for detecting the operation in the device.

The pressure sensor P, as illustrated in FIG. 3, is installed to a lower surface of the bonnet wall 25 or a side of the flow path. The pressure sensor P is connected to the space defined by the diaphragm 22 and the partition 241 of the bonnet 24 via the connection hole 241d. As a result, the pressure sensor P is possible to detect the pressure in the space defined by the diaphragm 22 and the partition 241 of the bonnet.

A packing 26 is interposed at a position where the pressure sensor P is connected to the connection hole 241d to ensure the airtightness.

A magnetic body M2 is installed to the opening 25b of the bonnet wall 25, and this magnetic body M2 constitutes the magnetic sensor with the magnet M1 installed to the diaphragm retainer 23.

With this magnetic sensor, the opening/closing operation of the valve is possible to be detected as follows. While the magnet M1 slides in response to the vertical movement of the diaphragm retainer 23, the magnetic body M2 is fixed to the inside of the valve body 1 with the bonnet wall 25 and the bonnet 24. As a result, it is possible to detect the operation of the diaphragm retainer 23 and the opening/closing operation of the valve based on changes in a magnetic field generated between the magnet M1, which is vertically moving in accordance with the vertical move of the diaphragm retainer 23, and the magnetic body M2 with a fixed position.

The magnetic sensor is used in this embodiment, but the present invention is not limited to this, and other types of sensors such as an optical positioning sensor may be used in other embodiments.

Each of the pressure sensor P and the magnetic sensor is connected to one end of the flexible cable 51 for communication having flexibility (the magnetic sensor is connected to the magnetic body M2 in detail), and the other end of the flexible cable 51 is connected to the circuit board 52 provided on the outside of the fluid control device V. Furthermore, the circuit board 52 is provided with a substantially rectangular-shaped connector 53 for connecting external terminals. As a result, it is possible to extract data measured by the pressure sensor P and the magnetic sensor.

In the present embodiment, a flexible printed circuits (FPC) is used for the flexible cable 51 and the circuit board 52, and flexible cable 51, circuit board 52, and connector 53 are integrally configured. By using the flexible printed circuits to the flexible cable 51 and the circuit board 52, it is possible to use a space between the members as a wiring path. As a result, it is possible to reduce the size of the fluid control device V itself as compared to using covered wires.

In addition, types and shapes of the connector 53 can be appropriately designed according to various standards.

According to the fluid control device V having such configuration, the data detected by the pressure sensor P and the magnetic sensor can be output to the outside. Then, such data may become an information for grasping the opening/closing operation of the valve, a leakage due to damage of the diaphragm 22, and an aging deterioration and an individual difference of the fluid control device V.

Assembly Process

Then, assembly processes of each member construing the fluid control device V according to the present embodiment will be described.

Figure 5:
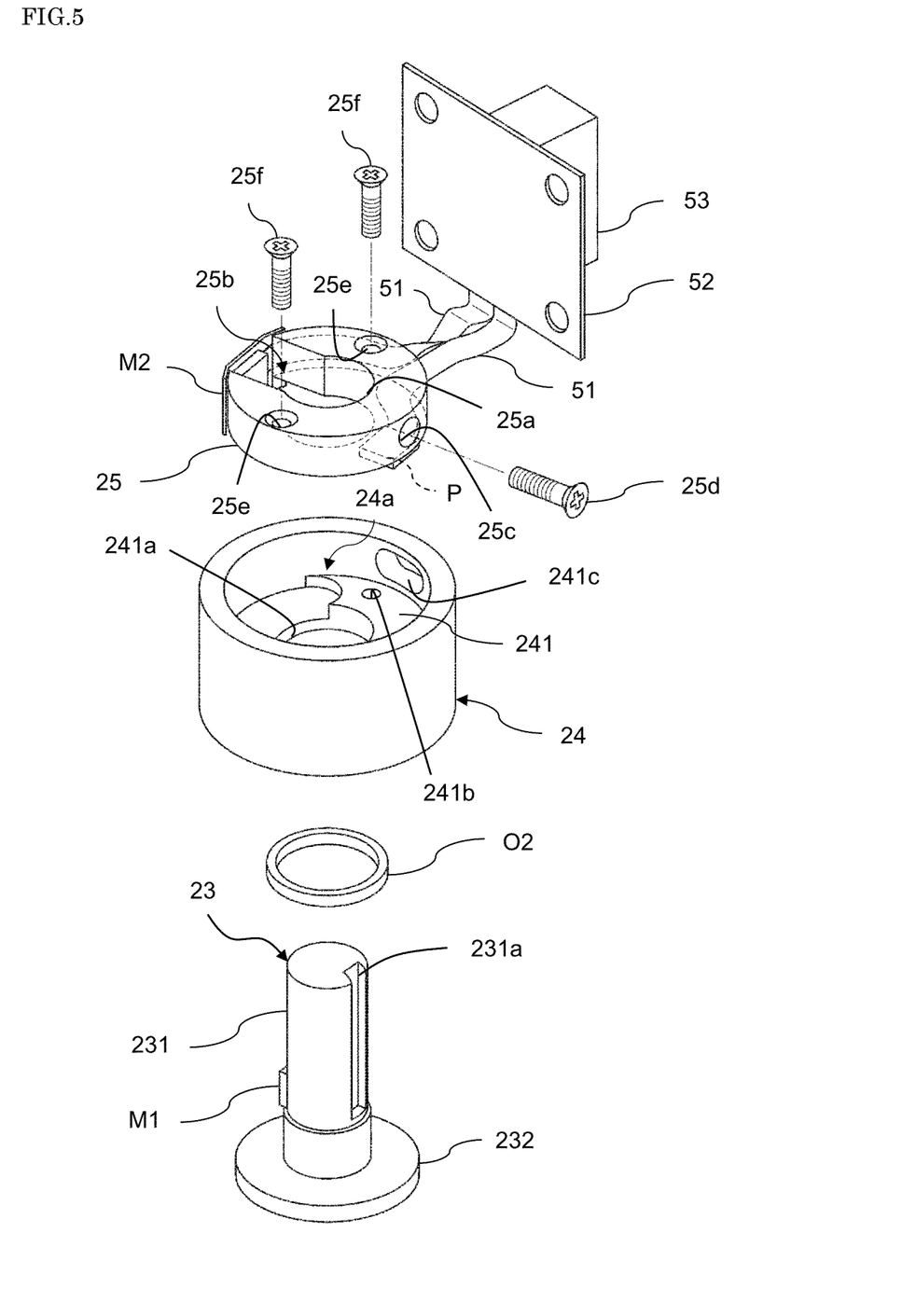
FIG. 5 is a diagram illustrating an exploded perspective view of the fluid control device according to the present embodiment.

First, the bonnet wall is stored in the bonnet 24, as illustrated in FIG. 5. At this time, one end of the flexible cable 51 is connected to the pressure sensor P of the bonnet wall 25 and the magnetic body M2 and the other end of the flexible cable 51 is lead to the outside from the through hole 241c.

Corresponding positions of the magnetic body M2 installed on the bonnet wall 25 and the magnet M1 installed on the diaphragm retainer 23, and the groove 231a provided on the diaphragm retainer 23 and the screw 25d, the diaphragm retainer 23 is penetrated to the penetration hole 241a of the bonnet 24 and the penetration hole 25a of the bonnet wall 25.

Then, as illustrated in FIG. 4, the bonnet part 2 is stored in the recess 12a of the valve body 1 in the order of the seat 21, the diaphragm 22, and the bonnet 24 where the bonnet wall 25 is installed, and the actuator body 41 is stored in the recess 12a. The valve body 1 is provided with the slit 12b which opens at one end on the side opposite to the base 11 and penetrates from the outside to a side of the recess 12a. As a result, when the bonnet part 2 is stored in the recess 12a, the bonnet part 2 can be smoothly stored in the recess 12a simply by aligning a position of the flexible cable 51 lead from the through hole 241c with a position of the slit 12b. Note that, it does not take time and effort to purposely pull out the flexible cable 51 from the valve body 1, and assembly workability is good After the bonnet part 2 is stored in the valve body 1, the actuator part 4 is arranged on the bonnet part 2, and the cover part 3 covers the valve body 1 and the actuator part 4. As illustrated in FIG. 1 and FIG. 6, in a covering process to cover the valve body 1 and the actuator part 4 by the cover part 3, the actuator body 41 and the upper ends of the valve body 1 are fitted inside of the cover 31, and the screw 31b is screwed into the screw hole 31a to fix the cover 31 to the valve body 1. Then, the circuit board 52 is interposed between the plate 32 and the plate 33, the plate 32 and 33 are screwed together to hold, the circuit board 52 is compressed and held between the plate 32 and the plate 33, and the cover 31 is fixed to these with the screw 31d.

In the above assembly of the fluid control device V according to the present embodiment, since one end on the opposite side to the base 11 is opened and the slit 12b penetrating from the outside to the side of the recess 12a is provided, it is possible to lead the flexible cable 51 from the recess 12a of the valve body 1 simply by storing the bonnet part 2 in the recess 12a from an upper end opening of the valve body 1. Therefore, it is easy to assemble, and there is no risk of damaging the flexible cable 51 and causing disconnection.

Furthermore, since the structure for acquiring data from the fluid control device V is a wired structure by the flexible cable 51, it is possible to communicate although a metal member such as stainless steel separates the outside from an installed location of the sensor, such as the pressure sensor P or the magnetic sensor. In addition, since the wired structure makes it possible to supply power to the sensor without battery replacement, it is suitable for the fluid control device V used in semiconductor manufacturing equipment where operators are difficult to access. Further, even in a space where devices are densely packed, such as in the fluid control apparatus (gas box) or in a semiconductor manufacturing apparatus, a reliable communication is possible without radio interference.

In the above-mentioned fluid control device V according to the present embodiment, a plurality of sensors, such as the pressure sensor P and the magnetic sensor including the magnet M1 and the magnetic body M2 is provided, but the present invention is not limited to this, and it is possible to have only one of the sensors.

REFERENCE SIGNS LIST 1 valve body
  11 base
  12 cylindrical part
    12a recess
    12b slit
2 bonnet part
  21 seat
  22 diaphragm
  23 diaphragm retainer
    231 base body
      231a groove
      231b screw
    232 increased diameter portion
  24 bonnet
    241 partition
    241a penetration hole
    241b screw hole
  25 bonnet wall
    25a penetration hole
    25b opening
3 cover part
  31 cover
  32 plate
  33 plate
4 actuator part
  41 actuator body
    41a penetration hole
    411 peripheral wall
  42 actuator cap
  43 piston
    43a opening
    431 increased diameter portion
    432 driving pressure introduction path
  44 spring
51 flexible cable
52 circuit board
53 connector
P pressure sensor
M1 magnet
M2 magnetic body
S driving pressure introduction chamber

The invention claimed is:

1. A fluid control device, capable of acquiring data related to an internal operation, comprising:
a bonnet part installed with one or a plurality of sensor for detecting the internal operation of the fluid control device; and
a valve body storing the bonnet part inside;
wherein the valve body is provided with
a recess storing at least a part of the bonnet part, and
a slit leading a communication cable connected to the sensor to an outside, opening one end on an opposite side of a base where a flow path is formed, and penetrating from the outside to the recess side
wherein one of the sensors is a magnetic sensor detecting changes in a magnetic field of a magnet and a magnetic body separated from each other, and
the fluid control device further comprising:
a cylindrical diaphragm retainer installing the magnetic body along with pressing a diaphragm; and
a rotation regulator regulating circumferential rotation of the diaphragm retainer, slidably inserted into a penetration hole provided in the bonnet part,
wherein the bonnet part installing the magnet along with having the penetration hole inserting the diaphragm retainer.

2. The fluid control device according to claim 1, wherein one of the sensors is a pressure sensor detecting a pressure in a space isolated by a diaphragm, and wherein the bonnet part installs the pressure sensor.

3. The fluid control device according to claim 2,
wherein an end of the cable is connected to a connector provided outside of the fluid control device, and
the fluid control device further comprising a fastener fastening the connector to the fluid control device.

4. The fluid control device according to claim 2, wherein the communication cable connected to the sensor is a flexible printed circuit with flexibility.

5. The fluid control device according to claim 1,
wherein an end of the cable is connected to a connector provided outside of the fluid control device, and
the fluid control device further comprising a fastener fastening the connector to the fluid control device.

6. The fluid control device according to claim 5, wherein the valve body has a rectangular base, and
the fastener fastens the connector to the fluid control device in a diagonal direction of the base of the valve body.

7. The fluid control device according to claim 6, wherein the communication cable connected to the sensor is a flexible printed circuit with flexibility.

8. The fluid control device according to claim 5, wherein the communication cable connected to the sensor is a flexible printed circuit with flexibility.

9. The fluid control device according to claim 1, wherein the communication cable connected to the sensor is a flexible printed circuit with flexibility.

10. The fluid control device according to claim 1,
wherein one of the sensors is a pressure sensor detecting a pressure in a space isolated by a diaphragm, and
wherein the bonnet part installs the pressure sensor.

11. The fluid control device according to claim 1,
wherein an end of the cable is connected to a connector provided outside of the fluid control device, and
the fluid control device further comprising a fastener fastening the connector to the fluid control device.

12. The fluid control device according to claim 1, wherein the communication cable connected to the sensor is a flexible printed circuit with flexibility.

* * * * *